J. M. PHINOUS.
RAIL JOINT, FISH PLATE, AND BRACE THEREFOR.
APPLICATION FILED OCT. 12, 1917.
1,261,285.
Patented Apr. 2, 1918.
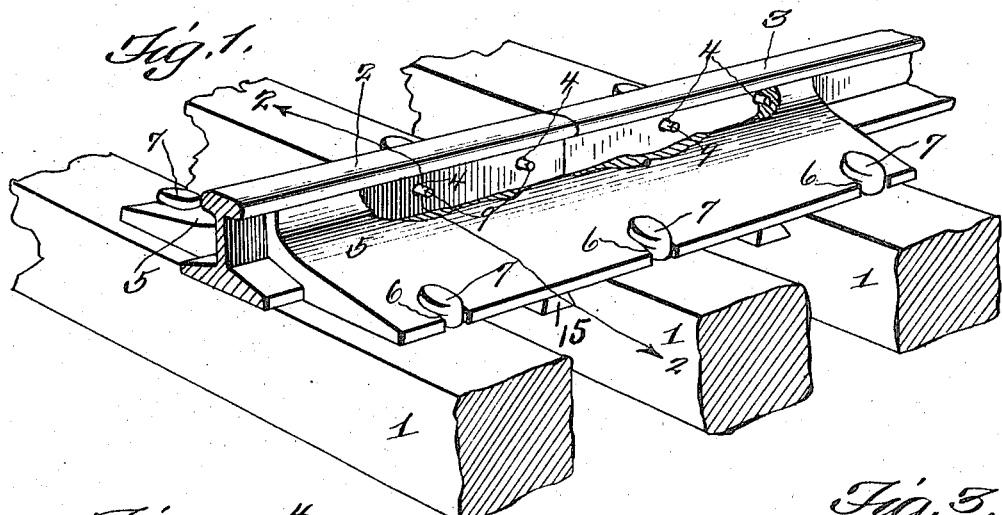
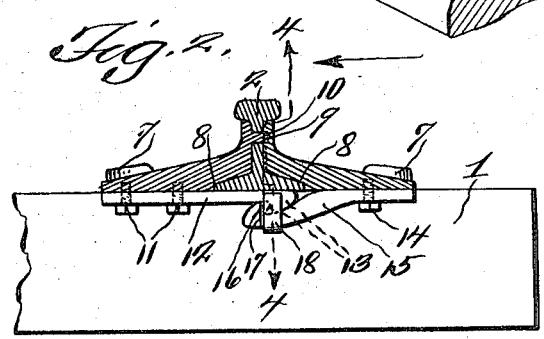
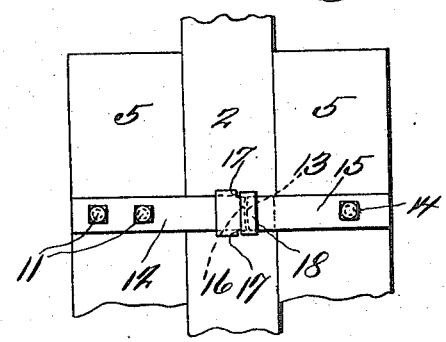
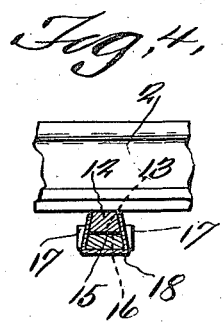
Inventor
James M. Phinous,
Witnesses
By
his Attorneys

UNITED STATES PATENT OFFICE.

JAMES M. PHINOUS, OF PAMPLIN, VIRGINIA, ASSIGNOR OF ONE-HALF TO GEORGE EDWARD SHORTER, OF DARLINGTON HEIGHTS, VIRGINIA.

RAIL-JOINT, FISH-PLATE, AND BRACE THEREFOR.

1,261,285.  Specification of Letters Patent.  Patented Apr. 2, 1918.

Application filed October 12, 1917.  Serial No. 196,152.

*To all whom it may concern:*

Be it known that I, JAMES M. PHINOUS, a citizen of the United States, residing at Pamplin, in the county of Appomattox, State of Virginia, have invented new and useful Rail-Joints, Fish-Plates, and Braces Therefor; and I do hereby declare the following to be a full, clear, and exact description of the invention, such as will enable others skilled in the art to which it appertains to make and use the same.

This invention relates to improved rail joint, fish plates and brace therefor, and one of the objects of the invention is to provide a pair of fish plates engaging the opposite sides of the webs of a pair of adjoining rails and having means passing through the webs to assist in holding the rails in place.

A further object of the invention is the provision of a rail brace consisting of two members engaging the extended parts of the bases of the fish plates and bridging the base of the rail and having detachable connections, thereby additionally insuring security for the rails.

A further object of the invention is the provision of means for insuring security between the connected ends of the members of said brace, and which means is dovetailed on the brace and removable.

In practical fields the details of construction may necessitate alterations falling within the scope of what is claimed.

The invention comprises further features and combination of parts as hereinafter set forth, shown in the drawings and claimed.

In the drawings:—

Figure 1 is a view in perspective of the improved rail joint, fish plates and the brace constructed in accordance with the invention.

Fig. 2 is a sectional view on line 2—2 of Fig. 1.

Fig. 3 is a bottom plan view of a portion of the rail and portions of the two fish plates, showing one of the braces.

Fig. 4 is a sectional view on line 4—4 of Fig. 2.

Referring more especially to the drawings, 1, 1, and 1 designate ties and 2 and 3 denote the adjoining rails, and 5 are the fish plates. The fish plates are substantially of the usual construction, excepting they have their base portions extended considerably on opposite sides, so as to insure a firm engagement with the upper faces of the ties. The webs of the rails 2 and 3 have apertures or openings 4, as shown clearly in Figs. 1 and 2.

The extended parts of the bases of the fish plates are provided with notches 6 adjacent their edges, to receive the spikes 7, the heads of which overlap the fish plates to hold them secure to the ties. The inner face of the upstanding part of one of the fish plates is provided with lugs 9, which pass through the openings or apertures 4 and engage depressions 10 of the inner face of the upstanding part of the other fish plate thereby preventing longitudinal movement of the rail. The fish plates are undercut to provide the recesses 8, which receive the base of the rails. Secured by bolts 11 to the under face of the extended part of one fish plate is a plate or strap 12, which underlies the base of the rail. The under face of the base portion of the other fish plate has a bolt 14, on which a strap or plate 15 is pivotally mounted. The plate or strap 15 is extended or made long enough to overlie the extended part of the strap or plate 12, which is provided with a hook 13. The end portion of the extended part of the strap or plate 15 has an upstanding hook 16, which engages the hook 13. These hooks are curved concentric with the center of the bolt 14, so that the plate or strap can be moved pivotally, so that the hooks may engage or disengage. The curvature of said hooks is clearly shown in Fig. 3 of the drawing. Referring to Figs. 1 and 4 it is to be noted that the plate or strap 15 is V-shaped in cross section, and the side walls of the hook 16 are provided with shoulders 17. A suitable spring clip V-shaped conforming to the cross sectional shape of the strap or plate 15 is provided. This spring clip 18 is slipped or passed longitudinally on the plate or strap 15 until it engages the shoulders 17, whereby the sides of the clip may overlie the engaging portions of the hooks 13 and 16, thereby preventing the hooks from disengaging accidentally. The clip is secured upon said plates or straps, that is their engaging hook parts, frictionally, since the arms of the clip are yieldable. However, by moving the clip toward the bolt 14 so that its arms are not overlying the hook 13 of the strap or plate 12, the plate or strap 15 may be moved pivotally on the bolt 14.

The invention having been set forth what is claimed as new and useful is:—

1. In a device as set forth, a pair of adjoining rails, a pair of fish plates engaging the base and the web of the rail, means passing through the web of the rail for securing the fish plates in place to prevent movement of the rails, said fish plates having extending bases resting on and secured to ties and a plurality of braces intermediate the ties and connecting the under parts of the bases of the fish plates, said braces, each consisting of a pair of straps or plates, one fixed to the base of one fish plate, the other one being pivotally connected to the base of the other fish plate, said straps or plates having hook connections immediately under the base of the rail and being concentric with the pivot of one strap, and means to insure security of said hook connections.

2. In a device as set forth, a pair of adjoining rails, a pair of fish plates engaging the base and the web of the rail, means passing through the web of the rail for securing the fish plates in place to prevent movement of the rails, said fish plates having extending bases resting on and secured to ties and a plurality of braces intermediate the ties and connecting the under parts of the bases of the fish plates, said braces, each consisting of a pair of straps or plates, one fixed to the base of one fish plate, the other one being pivotally connected to the base of the other fish plate, said straps or plates having hook connections immediately under the base of the rail, said connections being concentric with the pivot of one strap, and means to insure security of said hook connections, said means comprising a pair of shoulders on opposite sides of the hook of one strap, one of the straps and the hook connections of both straps being V-shaped in cross section, and a V-shaped clip conforming to and engaging the V-shaped cross sectional shape of said hooks and being limited in position by said shoulder.

In testimony whereof I have signed my name to this specification in the presence of two subscribing witnesses.

JAMES M. PHINOUS.

Witnesses:
S. PIERCE LONG,
W. R. BRIGHTWELL.

Copies of this patent may be obtained for five cents each, by addressing the "Commissioner of Patents, Washington, D. C."